Feb. 19, 1957  A. SOMERVILLE  2,781,969
CALCULATING APPARATUS

Filed Jan. 27, 1951  8 Sheets-Sheet 1

INVENTOR.
Alexander Somerville
BY
Attorney.

INVENTOR.
Alexander Somerville
BY
Attorney.

Feb. 19, 1957 A. SOMERVILLE 2,781,969
CALCULATING APPARATUS
Filed Jan. 27, 1951 8 Sheets-Sheet 3

INVENTOR.
Alexander Somerville
BY
Attorney.

INVENTOR.
Alexander Somerville

Feb. 19, 1957 A. SOMERVILLE 2,781,969
CALCULATING APPARATUS
Filed Jan. 27, 1951 8 Sheets-Sheet 5
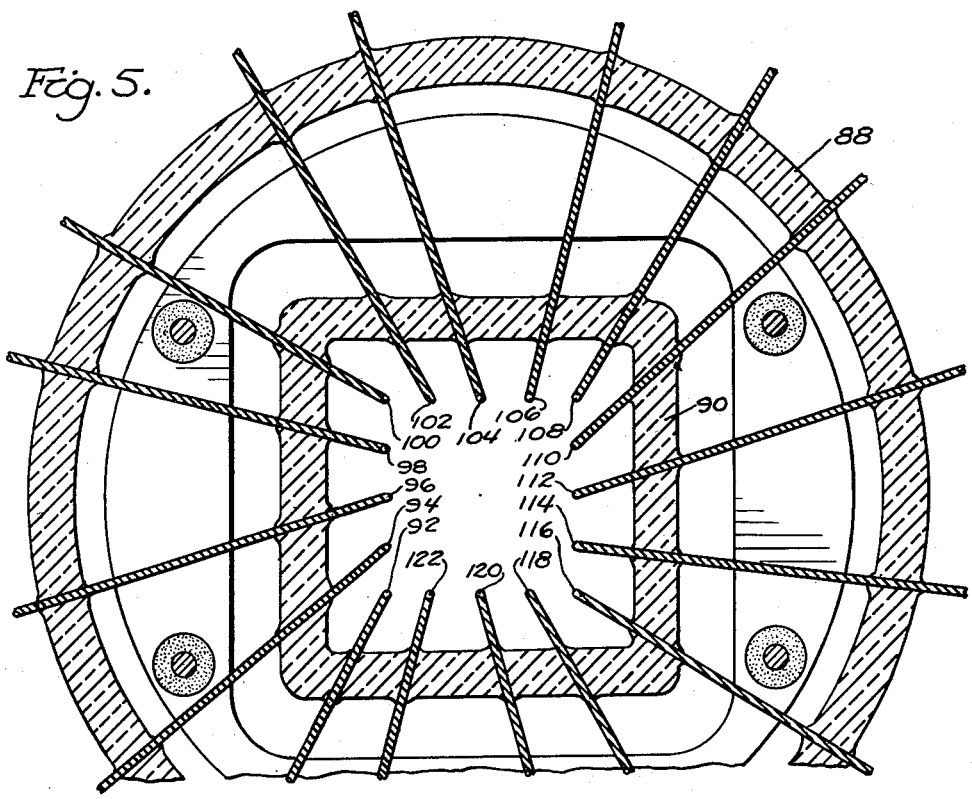
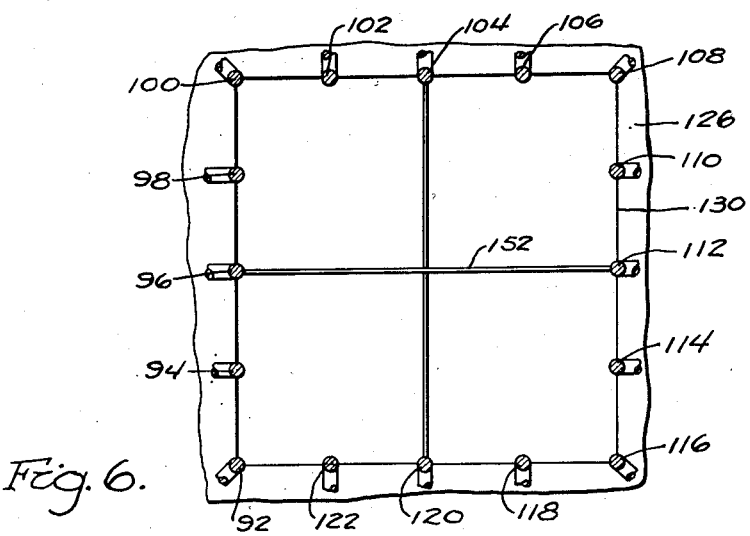
INVENTOR.
Alexander Somerville
BY
Attorney.

INVENTOR.
Alexander Somerville
BY
O. H. Fowler
Attorney.

Feb. 19, 1957  A. SOMERVILLE  2,781,969
CALCULATING APPARATUS
Filed Jan. 27, 1951  8 Sheets-Sheet 7
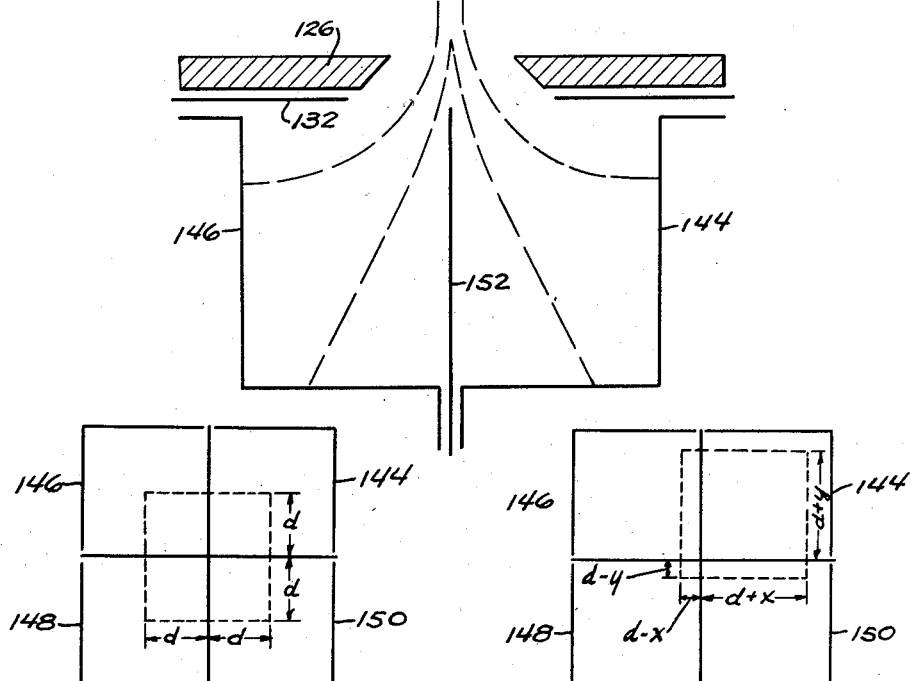
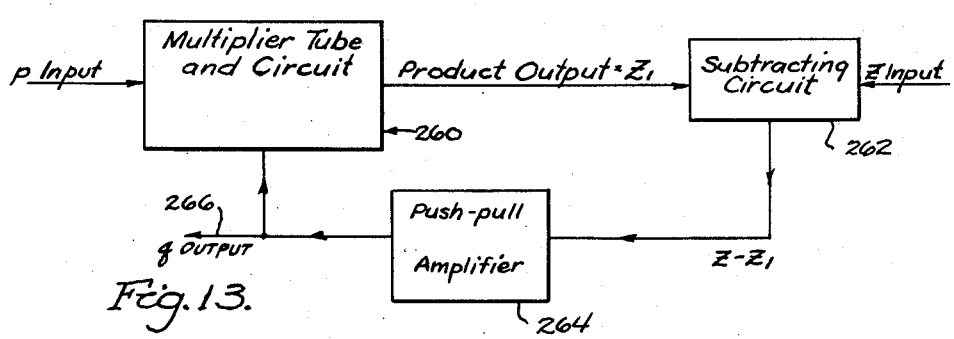
INVENTOR.
Alexander Somerville
BY
O. H. Fowler
Attorney.

Feb. 19, 1957  A. SOMERVILLE  2,781,969
CALCULATING APPARATUS
Filed Jan. 27, 1951  8 Sheets-Sheet 8

INVENTOR.
Alexander Somerville
BY
Attorney.

United States Patent Office 2,781,969
Patented Feb. 19, 1957

2,781,969

CALCULATING APPARATUS

Alexander Somerville, Birmingham, Ala.

Application January 27, 1951, Serial No. 208,184

19 Claims. (Cl. 235—61)

This invention relates to apparatus for determining the relationship between a pair of variable quantities and more particularly to apparatus for providing an indication of the product or quotient of a pair of variable quantities.

With the development of electrical computers for solving complex mathematical equations, a great need has arisen for a simple apparatus which will instantaneously determine the product or quotient of a pair of variable quantities. The apparatus now in use for accomplishing such results generally operate on electromagnetic or electromechanical principles. Such apparatus is relatively complex and somewhat slow and inaccurate. Because of its slow operation, the apparatus can only operate on input signals having relatively low frequencies. Furthermore, no indication is provided as to whether the product or quotient of the variable quantities has a positive or negative polarity.

This invention provides apparatus for, and methods of, translating the geometric relationship between a pair of variable quantities, such as the product of the variable quantities, into an arithmetic relationship involving only addition and subtraction. By converting the geometric relationship into an arithmetic relationship, the apparatus facilitates the computation and provides a rapid and accurate indication of the desired result. The apparatus determines the geometric relationship between quantities having negative as well as positive polarities and is capable of handling signals having a frequency range from zero cycles per second to more than one megacycle per second.

An object of this invention is to provide apparatus for accurately determining the product or quotient of a pair of variable quantities.

Another object is to provide apparatus of the above character for converting the geometric relationship between a pair of variable quantities, such as the product or quotient of the quantities, into an arithmetic relationship in which an indication of the desired result is obtained by simple addition and subtraction.

A further object is to provide apparatus of the above character for converting the geometric relationship between a pair of variable quantities into a deflection of a beam, splitting the beam into quadrants and adding and subtracting the beam strengths in the different quadrants in a predetermined manner to obtain the desired result.

Still another object is to provide apparatus of the above character for determining the geometric relationship between a pair of variable quantities having either a positive or negative polarity and for indicating the polarity of the result.

A still further object is to provide apparatus of the above character for rapidly and accurately determining the geometric relationship between a pair of variable quantities represented by direct voltage inputs as well as inputs having frequencies up to and including the video range.

Another object is to provide apparatus of the above character which is simple, compact, reliable and relatively inexpensive.

Other objects and advantages will be apparent from a detailed description of the invention and from the appended drawings and claims.

Figure 4:
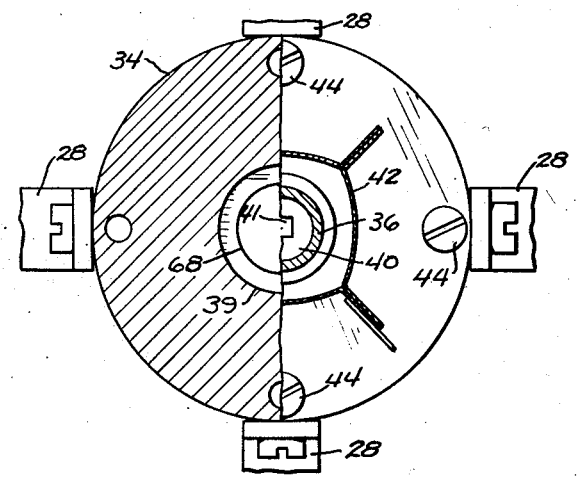
Figure 3A:
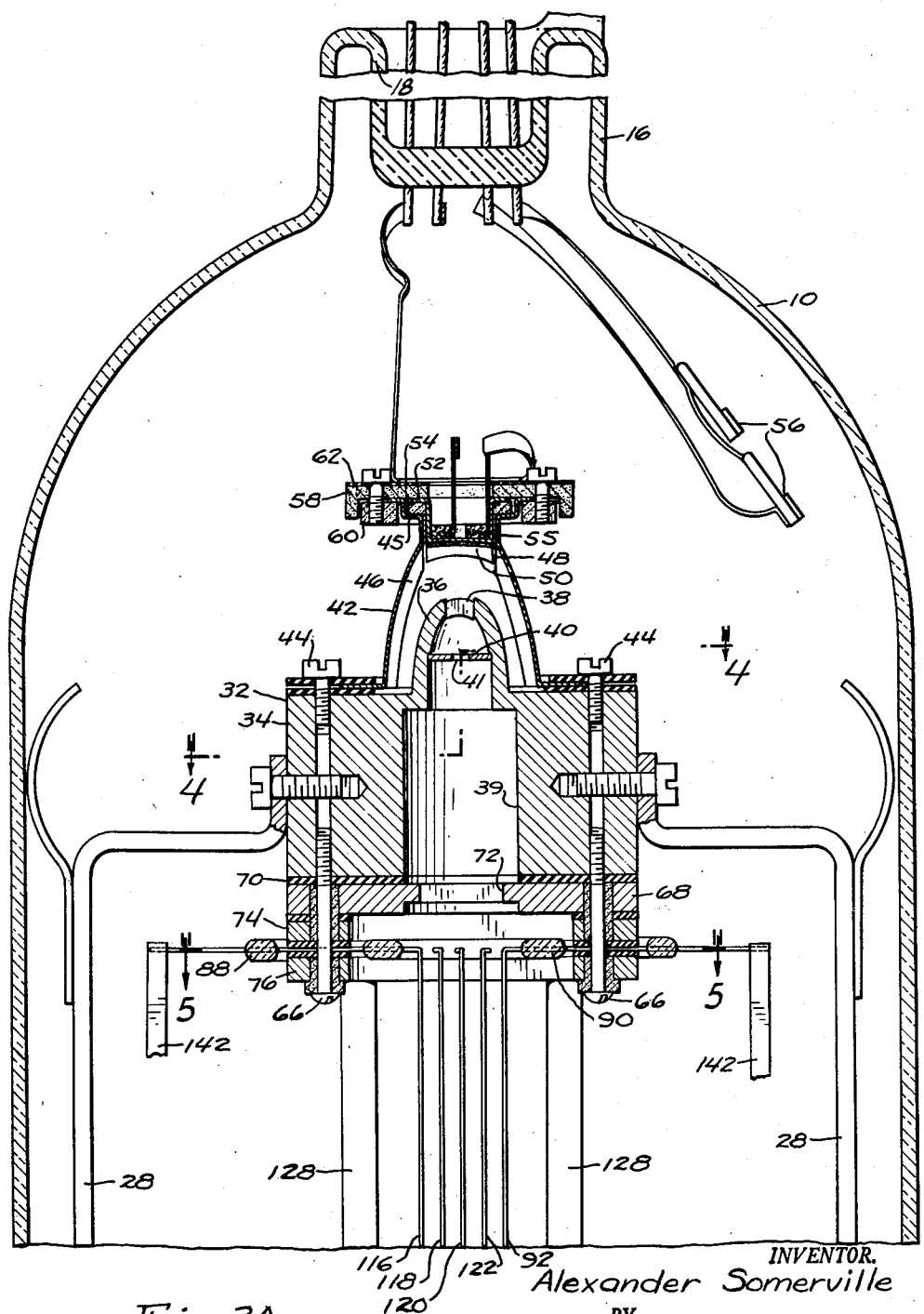
Figures 3A and 3B are enlarged sectional views taken substantially on the line 3—3 of Figure 2 and showing respectively the top and bottom portions of the tube, including the glass envelope, but with Figure 3B being somewhat fragmentary at the bottom.
Figure 3B:
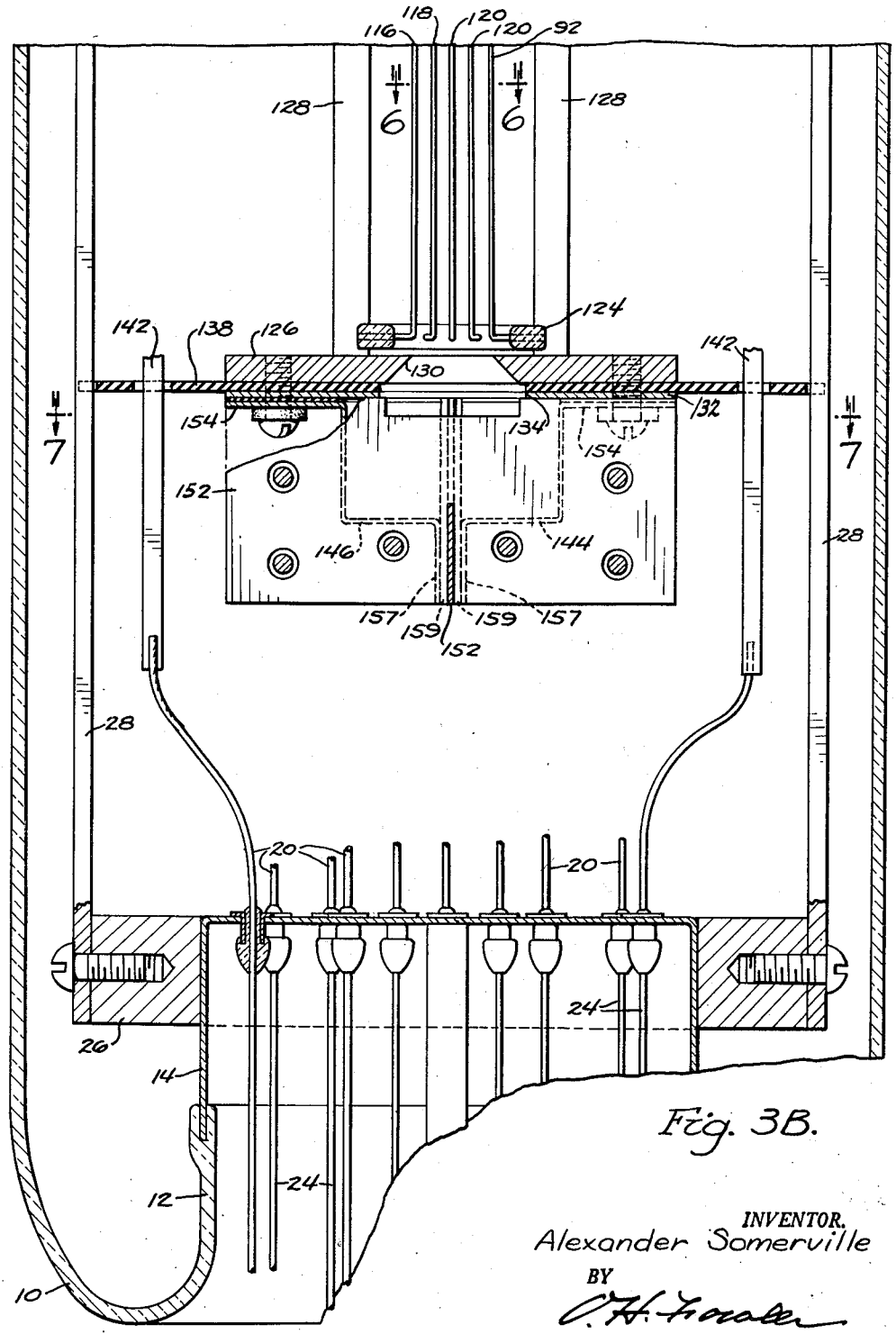
Figure 7:
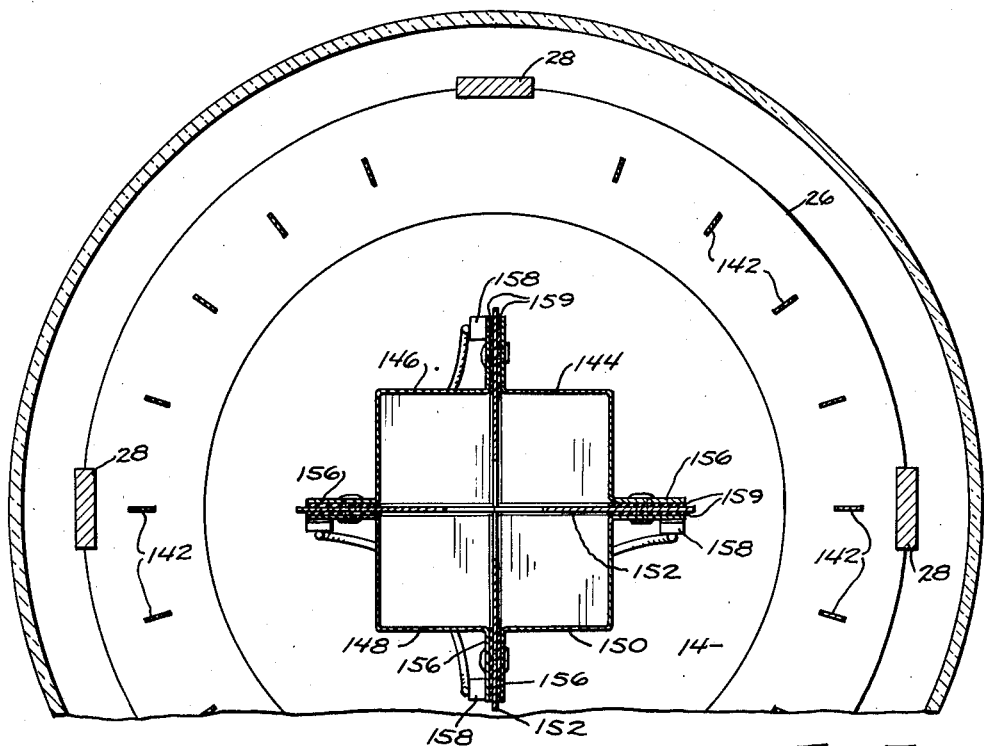
Figure 8:
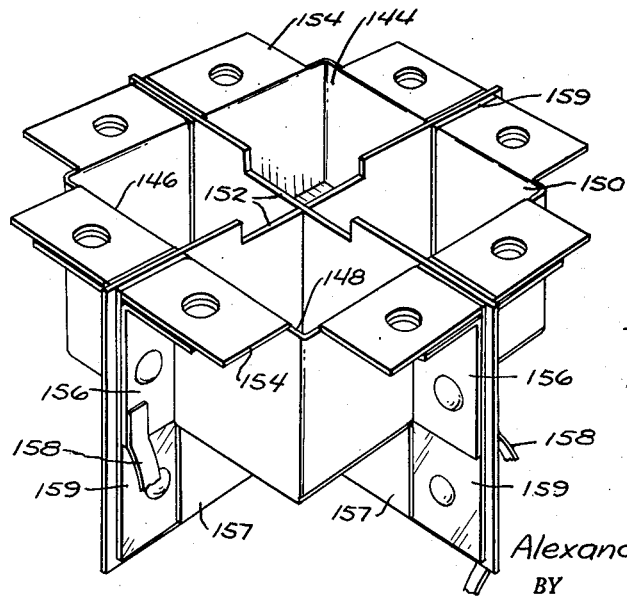
Figure 12:
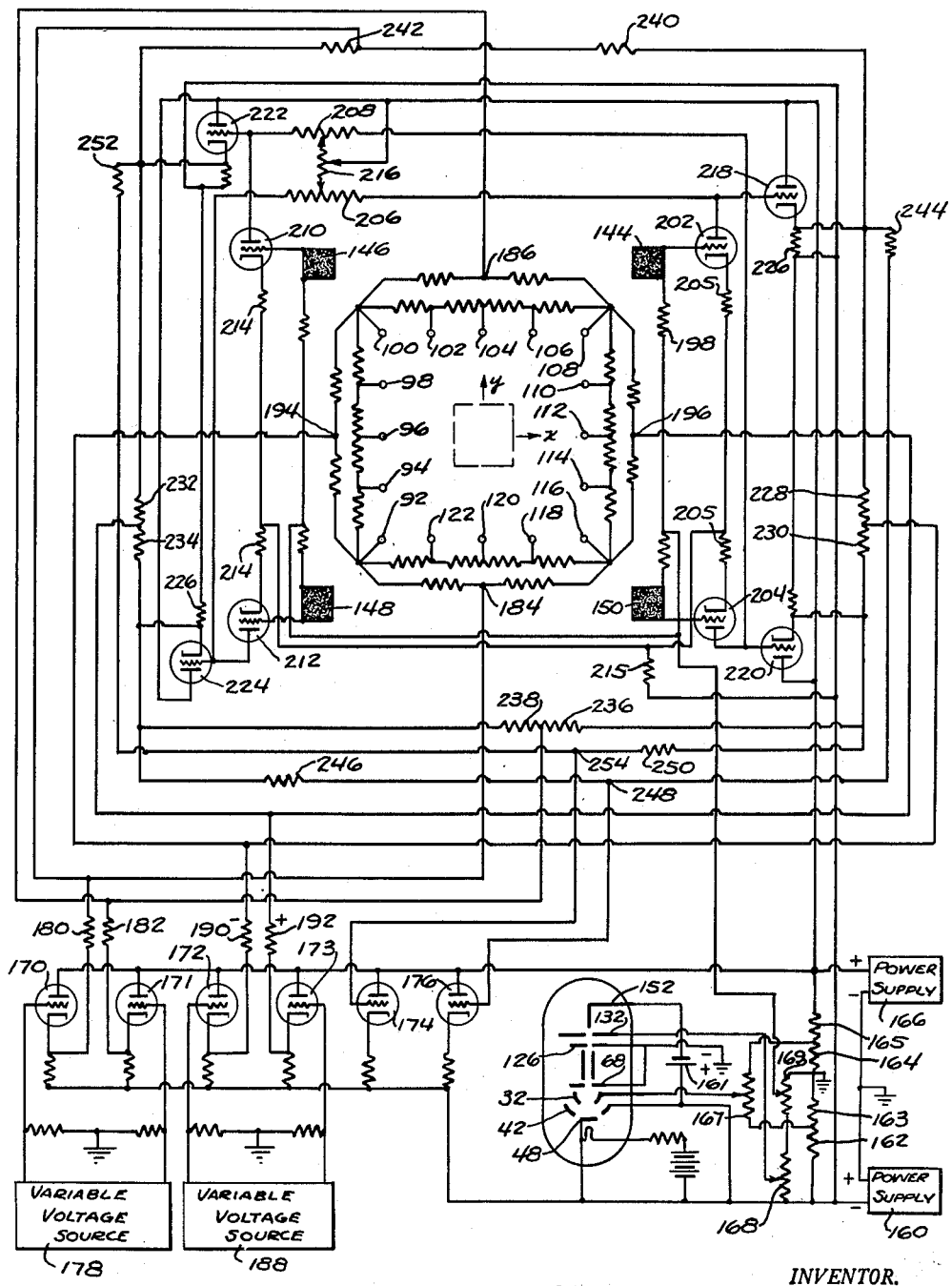

Figures 4 and 5 are enlarged sectional views taken substantially on the lines 4—4 and 5—5, respectively, of Figure 3A;

Figures 6 and 7 are enlarged sectional views taken substantially on the lines 6—6 and 7—7, respectively, of Figure 3B;

Figure 8 is an enlarged perspective view of some of the output components of the multiplier tube, as seen from a position somewhat above and in front of the components;

Figure 9 is a simplified schematic diagram illustrating the operation of the output components of the tube;

Figure 10 is a schematic diagram illustrating the position of the electron beam relative to the output components shown in Figures 8 and 9 when the input voltages representing the variable quantities to be multiplied are zero;

Figure 11 is a schematic diagram similar to Figure 10 but illustrating the position of the electron beam relative to the output components when the two input voltages have values different from zero;

Figure 12 is a circuit diagram, partly schematic, for converting different portions of the electron beam into a single signal proportional to the product of the two input voltages; and Figure 13 is a schematic diagram, essentially in block form, illustrating the operation of the tube and circuit shown in the previous figures to obtain the quotient of a pair of variable quantities.

In one embodiment of the invention, a glass envelope 10 (Figures 3A and 3B) is provided. At its bottom end, the glass envelope 10 has an introverted lip portion 12 (Figure 3B) sealed by a cylinder 14, and at its top end the envelope has an upwardly extending neck portion 16 (Figure 3A) sealed by an introverted lip portion 18.

A plurality of electrical terminals 20 (Figures 1 and 3B) insulated from the cylinder 14 as by glass beads fit into an outer and inner array of holes in the cylinder 14. Insulated electrical leads 24 are connected from the terminals 20 to appropriate terminals outside the envelope 10, as will be disclosed in detail hereinafter in connection with the circuit shown in Figure 12.

The cylinder 14 has a downwardly turned flange which suitably supports a ring 26 (Figures 1 and 3B), and the ring 26 in turn supports as by screws a plurality of upwardly extending brackets 28 equally disposed around its circumference. An anode 32 (Figures 1 and 3A) is fastened as by screws to the upper end of each bracket 28. The anode includes a cylindrical body 34 (Figures 3A and 4) and a nipple 36 extending upwardly from the body 34. The nipple 36 is provided with an orifice 38 having a substantially square mouth. The orifice 38 increases in width as it extends into the nipple and communicates with an annular aperture 39 in the body 34. A horizontally disposed diaphragm 40 having a square opening 41 is suitably secured to the nipple 36 approximately equidistant between the top and bottom of the nipple. The opening 41 in the diaphragm 40 is smaller than the mouth of the orifice 38.

An electrode 42 (Figures 1, 3A and 4) is attached as by suitable bolts 44 to the body 34 of the anode 32 and is insulated from the anode as by washers. The electrode 42 has a substantially rectangular base and side walls which slope upwardly from the base in a generally pyramidal contour. Before the apex of the pyramid is reached, the side walls of the electrode 42 extend vertically upwardly and flange outwardly as at 45 (Figure 3A). A hole 46 having in general a pyramidal shape conforming to the electrode side walls extends through the electrode and communicates with the orifice 38 in the anode nipple 36.

A hollow cathode 48 is positioned in the electrode hole 46. The cathode has a surface 50 (Figure 3A) which is provided with a coating adapted to emit electrons when heated and which is concavely shaped to direct the electrons in a converging beam towards the anode orifice 38. The cathode 48 also has a flange 52 which is supported by the flange 45 on the electrode 42 and which is suitably insulated from the flange 45 by a washer 54. A heater 55 having a plurality of turns of fine wire arranged in pancake style is positioned within the cathode 48 to furnish heat to the cathode. External connections to the cathode 48, the heater 55 and getters 56 for absorbing undesirable gas in the envelope 10 are made through the lip portion 18.

The cathode 48 and heater 55 are covered by a bracket 58 (Figures 1 and 3A) having downwardly turned flanges. The flanges on the bracket 58 press the legs of a U-shaped clamp 60 against the side walls of the electrode 42 adjacent the flange 45. The bracket 58 and clamp 60, both of which are made from a suitable insulating material such as soapstone, maintain the cathode 48 and heater 55 in fixed position relative to the electrode 42 when screws extending through the bracket and clamp are tightened. The screws also secure an insulating plate 62 which supports terminals for connection to electrical leads extending to such members as the cathode 48 and heater 55.

In addition to supporting the electrode 42, the anode 32 supports as by bolts 66 a lens electrode 68 (Figures 1 and 3A) insulated from the anode 32 by a gasket 70 and having a centrally disposed annular opening 72 which is smaller than the aperture 39 in the anode. The bolts 66 also pin against the lens electrode 68 a pair of annular plates 74 and 76 having centrally disposed square openings larger than the lens opening 72. The plate 74 is insulated by a suitable gasket from the electrode 68 and by a pair of gaskets from the plate 76. A plurality of wires, hereinafter to be described in detail, are clamped by the bolts 66 between the gaskets insulating the plates 74 and 76.

A glass ring 88 (Figures 1, 3A and 5) surrounding the plates 74 and 76 and a rectangular glass bead 90 positioned in the central openings of the plates 74 and 76 maintain the wires in a fixed position relative to one another, such that the wires have equally spaced radial positions in a horizontal plane. At positions radially inwardly of the bead 90, the wires are bent downwardly at a 90° angle to form a square deflection system.

Figure 1:
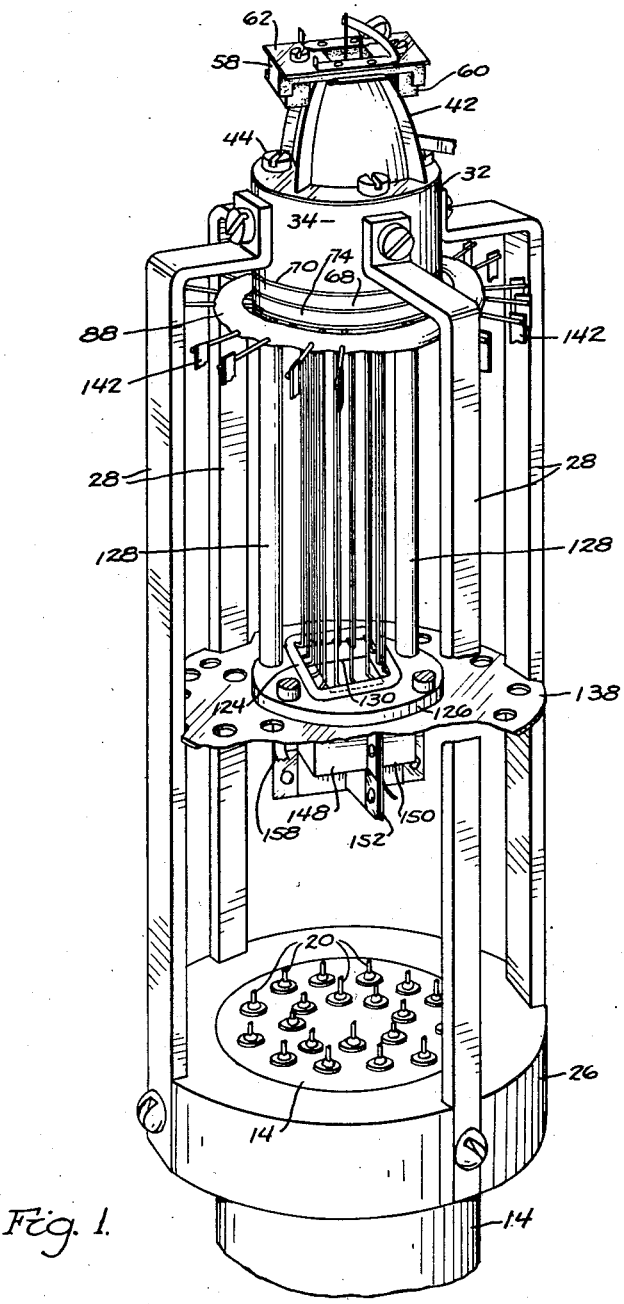
Figure 1 is a simplified perspective view of a multiplier tube with its glass envelope removed, the view being taken from a position in front of and somewhat above the tube and with certain parts being broken away to show the relative position of other parts.
Figure 2:
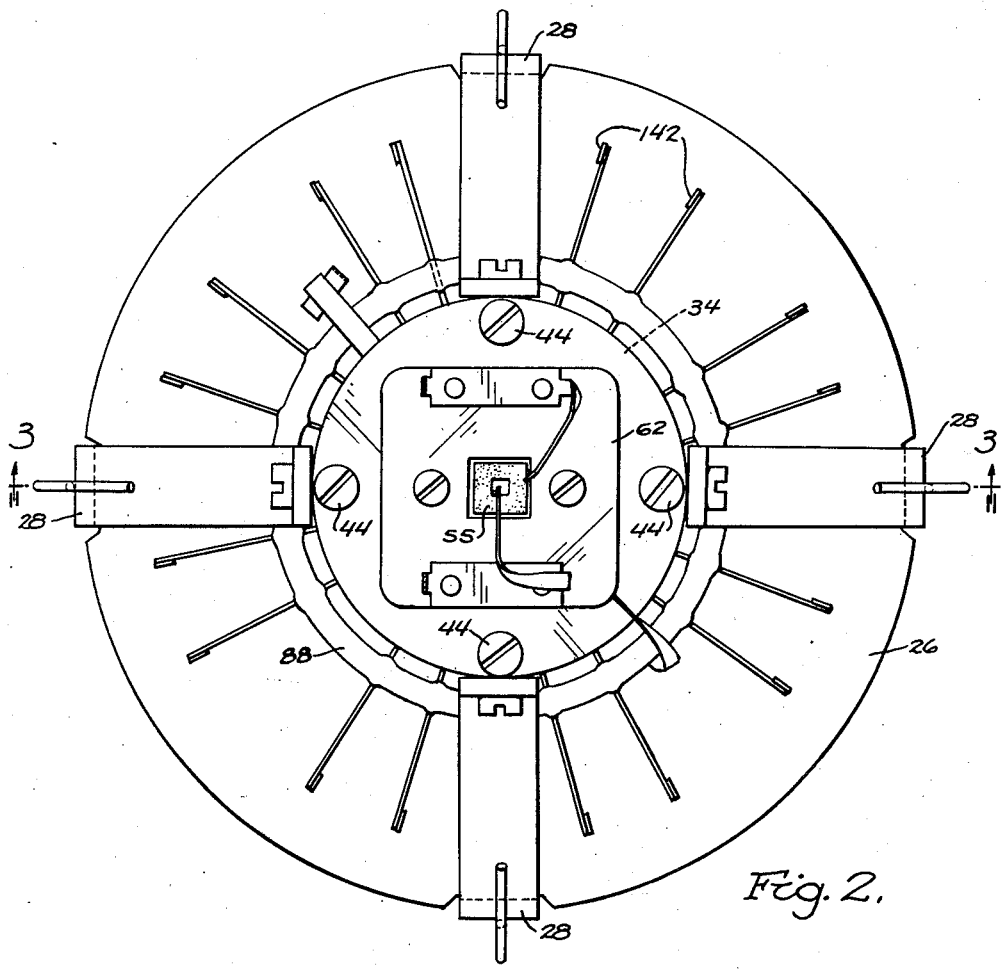
Figure 2 is an enlarged top plan view of the multiplier tube with the glass envelope removed.

Equally spaced wires 92, 94, 96, 98 and 100 (Figures 5, 6 and 12) form one side of the deflection system and equally spaced wires 100, 102, 104, 106 and 108 form a second side perpendicular to the first side but equal to it in length. In like manner, wires 108, 110, 112, 114 and 116 form a third side parallel to the first side and wires 116, 118, 120, 122 and 92 form a fourth side parallel to the second side. The wires 92 to 122, inclusive, are held at their lower end in fixed position relative to one another by a square glass bead 124 (Figures 1 and 3B). The deflector system disclosed above is made from sixteen equally spaced wires, but other numbers of wires may also be used. Two pairs of parallel deflector plates, each pair of plates being perpendicular to the other pair, may also be used instead of the wires disclosed above.

A lens electrode 126 (Figures 1, 3B and 9) positioned just below the glass bead 124 is held in fixed position relative to the anode 32 by a plurality of long studs 128. A square opening 130 (Figures 3B and 9) of gradually increasing cross-sectional area is provided in the center of the electrode 126 to electrically isolate the deflector network above the electrode from the collecting members below the network. A splitter back plate 132 having a centrally located square opening 134 corresponding to the square opening 130 in the electrode 126 is fastened to the electrode as by screws. A gasket 138 having an exposed periphery provides electrical insulation between the electrode 126 and the splitter back plate 132. Electrical leads 142 extend from the terminals 20 through holes in the exposed periphery of the gasket 138 to the upper ends of the wires 92 to 122, inclusive, and to certain other members, such as the lens electrode 68.

A plurality of catcher plates 144, 146, 148 and 150 (Figures 1, 3B, 7 and 8) separated by a splitter 152 are located below the splitter back plate 132. Each of the catcher plates 144, 146, 148 and 150 has a bottom wall and a pair of side walls perpendicular to each other and to the bottom wall. The side walls in the different catcher plates are complementary to one another in that they define a substantially continuous square boundary when arranged in a predetermined manner relative to one another, the square boundary being subdivided into smaller squares by the splitter 152.

Flanges 154 (Figures 3B and 8) extend horizontally outwardly from the side walls of each catcher plate. The flanges 154 are attached to the splitter back plate 132 and the lens electrode 126 as by screws and are insulated from the plate 132 as by suitable washers (Figure 3B). Flanges 156 also extend vertically outwardly from the side walls of each catcher plate, and flanges 157 (Figures 3B and 9) extend downwardly from the bottom walls of each catcher plate. Lugs 158 (Figure 8) are provided on the flanges 156 for electrical connections to the terminals 20.

The splitter 152 includes a pair of perpendicular arms having a height corresponding to the combined height of the flanges 156 and 157 on each of the catcher plates 144, 146, 148 and 150. Pairs of flanges 156 are suitably secured to the opposite ends of each splitter arm, and the flanges 156 in each pair are insulated from the splitter arm by strips 159 (Figures 3B and 8) of insulating material secured as by rivets to the arm. Pairs of flanges 157 are similarly secured to, and insulated from, the arms of the splitter 152. Attachment of the flanges 156 and 157 to the splitter arms maintains the collector plates 144, 146, 148 and 150 in fixed and proximate position relative to one another.

The electrical connections to the different elements of the tube disclosed above are shown in Figure 12, the different elements being illustrated schematically in the figure. As may be seen, a negative voltage of approximately 300 volts is applied to the electrode 42 and the cathode 48 by a suitable power supply 160, and the splitter 152 is biased slightly negative relative to the electrode 42 and cathode 44 as by a suitable battery 161.

Approximately ground potential is applied to the anode 32 through a divider network which includes resistances 162, 163, 164 and 165 in series between the power supply 160 and a power supply 166 and which also includes a potentiometer 167 having its stationary contacts connected across the resistances 163 and 164 and its movable contact connected to the anode. The power supply 166 is adapted to provide a positive voltage of approximately 300 volts. The lens electrodes 68 and 126 are grounded and the splitter back plate 132 is connected to the movable contact of a potentiometer 168, which is in series with a potentiometer 169 between the power supply 160 and the grounded terminal common to the resistances 163 and 164.

The full voltage of approximately 300 volts from the power supply 166 is applied to the plates of tubes 170, 171, 172, 173, 174 and 176. The grids of the tubes 170 and 171 are grounded through equal resistances and a voltage having a magnitude proportional to, and a polarity similar to, one of the variable quantities to be multiplied is applied in push-pull across the resistances from a source 178. The cathodes of the tubes 170 and 171 are connected through equal resistances to the negative terminal of the voltage source 160 and through equal resistances 180 and 182 to the terminals 184 and 186, respectively, in the deflector network comprising the wires 92 to 122, inclusive.

Similarly, connections to the grids of the tubes 172 and 173 are made from grounded resistances of equal value and from the output terminals of a source 188 adapted to supply a voltage having a magnitude proportional to, and a polarity similar to, the second variable quantity in the computation. The cathodes of the tubes 172 and 173 are connected to the negative terminal of the voltage source 160 through resistances equal to the resistances which are connected to the cathodes of the tubes 170 and 171. The cathodes of the tubes 172 and 173 are also connected to resistances 190 and 192 equal to the resistances 180 and 182, and the resistances 190 and 192 are in turn respectively connected to terminals 194 and 196 in the deflector network.

The terminals 184 and 194 are connected through a pair of equal resistances to the deflector wire 92. Similarly, the terminals 194 and 186 are connected to the deflector wire 100 through a pair of resistances equal to the resistances which connect the terminals 184 and 194 to the deflector wire 92. Resistances equal to the previously mentioned resistances connect the terminals 186 and 196 to the deflector wire 108 and the terminals 196 and 184 to the deflector wire 116.

Resistances of equal value connect successive pairs of deflector wires, such as the wires 92 and 94 and the wires 94 and 96. These resistances cause the voltage difference between opposite terminals 184 and 186 or between opposite terminals 194 and 196 to appear in gradual and equal steps on successive deflector wires.

As previously disclosed, the deflector system is associated with the collector plates 144, 146, 148 and 150, represented diagrammatically outside of the tube as square blocks in Figure 12. Connections between the collector plates 144 and 150 are provided through a first pair of equal resistances 198 and between the collector plates 146 and 148 through a second pair of resistances equal in value to the resistances 198. Each pair of resistances has a common terminal connected to the movable contact of the potentiometer 169.

The collector plates 144 and 150 are also connected to the grids of tubes 202 and 204, respectively, the cathodes of which have equal resistances 205 connected to them. The plates of the tubes 202 and 204 are connected to the right side of potentiometers 206 and 208, respectively, in Figure 12. Similarly, the grids of tubes 210 and 212 are connected to the collector plates 146 and 148, respectively, and the cathodes of the tubes are connected to resistances 214 equal to the resistances 205. Each pair of resistances 205 and 214 has a common terminal which is connected through a resistance 215 to the negative terminal of the power supply 160.

The plates of the tubes 210 and 212 are connected to the left side of the potentiometers 208 and 206, respectively, in Figure 12. The movable arms of the potentiometers 206 and 208 are connected to the opposite sides of a potentiometer 216 which in turn has a movable arm connected to the plates of tubes 218, 220, 222, and 224. The plates of the tubes 218, 220, 222 and 224 are supplied with positive voltage from the power supply 166.

The grids of the tubes 218, 220, 222 and 224 are connected to the plates of the tubes 202, 204, 210 and 212, respectively. The cathodes of the tubes 218, 220, 222 and 224 are connected through equal resistances 226 to the negative terminal of the power supply 160.

Equal resistances 228 and 230 are also connected between the cathodes of the tubes 218 and 220, and the common terminal between the resistances is connected to the terminal 194. Similarly, the terminal 196 is connected to the common terminal between resistances 232 and 234, which are connected to the cathodes of the tubes 222 and 224, respectively. Connections are respectively made from the cathodes of the tubes 220 and 224 to resistances 236 and 238 and from the cathodes of the tubes 218 and 222 to resistances 240 and 242. The common terminals between the resistances 236 and 238 and between the resistances 240 and 242 are connected to the terminals 186 and 184, respectively.

The cathodes of the tubes 218 and 224 are also connected through equal resistances 244 and 246, respectively, to a terminal 248, which is in turn connected to the grid of the tube 176. In like manner, resistances 250 and 252 equal to the resistances 244 and 246 are connected from the cathodes of the tubes 220 and 222, respectively, to a terminal 254, which is in turn connected to the grid of the tube 174. The cathodes of the tubes 174 and 176 are connected to the negative terminal of the power source 160 through resistances equal to the resistances which are connected to the cathodes of the tubes 170, 171, 172 and 173.

In operation, a convergent beam of electrons is emitted from the surface 50 of the cathode 48 (Figure 3A) and is directed by the electrode 42 (Figures 3A and 4) and the anode 32 through the rectangular orifice 38 in the anode nipple 36. The electron beam is further sharpened and squared by the diaphragm 40, which prevents stray electrons from entering the anode aperture 39. The electron beam then passes through the opening 72 in the lens electrode 68, which controls by the difference in voltage between it and the anode 32 the area occupied by the beam in horizontal cross-section.

The square beam which passes through the lens opening 72 is deflected by the deflector system which includes the wires 92 to 122, inclusive. As previously disclosed, a voltage difference proportional to one of two variable quantities whose geometric relationship is to be determined is applied from the source 178 (Figure 12) to the grids of the tubes 170 and 171 in cathode follower stages. The resultant voltage difference between the cathodes of the tubes 170 and 171 is applied between the terminals 184 and 186 to produce a voltage of one polarity on the deflector wires 100, 102, 104, 106 and 108 and an equal voltage of opposite polarity on the wires 92, 122, 120, 118 and 116. At the same time, voltages of progressive value are impressed upon the wires 98, 96 and 94 and upon the wires 110, 112 and 114, such that the voltage difference from the terminals 100 and 108 to the terminals 92 and 116 is gradated along the wires 98 and 110, 96 and 112, and 94 and 114 in equal steps. For example, for a variable quantity having a value of "10," +5 volts may be applied to the wires 100, 102, 104, 106 and 108, and −5 volts to the wires 92, 122, 120, 118 and 116. Wires 98 and 110 will then have +2.5 volts impressed upon them, wires 96 and 112 0 volts and wires 94 and 114 −2.5 volts.

Similarly, a voltage difference proportional to the other variable quantity in the computation is applied from the source 188 to the grids of the tubes 172 and 173. After being acted upon by the cathode follower stages, which include the tubes 172 and 173, the resultant voltage difference is impressed across the terminals 194 and 196.

As the electron beam travels along the length of the deflection system, it is deflected by the electrostatic field created by the voltage on the deflector wires in a direction and through an angle proportional to the input voltages applied on the deflection network. Thus, the difference in voltage between the terminals 184 and 186 produces a proportionate deflection to the back or front of the tube, depending upon whether the number represented by the voltage difference is positive or negative. Similarly, the difference in voltage between the terminals 194 and 196 produces a proportionate deflection to the right or left.

After being deflected by the wires 92 to 122, inclusive, the beam passes into the opening 130 (Figure 3B) in the lens electrode 126. The lens electrode 126 acts to sharpen the beam by eliminating stray electrons on the fringe of the beam. The lens electrode also acts as an isolating grid to prevent the electrons in the beam from being influenced by the potentials on the splitter back plate 132, the splitter 152 and the catcher plates 144, 146, 148 and 150 until the beam is actually passing through the opening 130. Because of the difference in voltage between them, the lens electrode 126 and the splitter back plate 132 produces an expansion in the electron beam as the beam passes through the opening 130 in the lens electrode and the opening 134 in the splitter back plate. Thus, as illustrated in Figure 9, the electrons in the beam curve away from one another and from the splitter 152 during their movement to the collector plates 144, 146, 148 and 150.

After passing through the openings 130 and 134 in the electrode 126 and splitter back plate 132, respectively, the electron beam is electrically divided by the negative voltage applied on the arms of the splitter 152 (Figures 3B, 7 and 8). Each beam quadrant is substantially independent of the other quadrants, since the electrons composing each quadrant cannot escape into any of the other compartments from the compartment formed by the splitter 152 and one of the catcher plates. Furthermore, any secondary electron emission from one of the catcher plates is contained within the compartment formed by the catcher plate and the splitter and is collected by the catcher plate because of the negative voltage of the splitter back plate 132 and the splitter 152 relative to the catcher plate.

The mechanical and electrical isolation of the catcher plates from one another causes the strength of the beam portions collected on the different collector plates to be largely independent of the voltages on the plates. Thus, the relative strength of each beam quadrant is dependent only upon the deflection of the beam during its passage through the deflector network. For example, the beam portions impinging on each of the collector plates 144, 146, 148 and 150 have equal strengths when no voltage is applied between the terminals 184 and 186 and between the terminals 194 and 196. The position of the electron beam relative to the collector plates for a condition of zero deflection voltages is shown in broken lines in Figure 10. If, for example, the terminal 186 is made positive and the terminal 184 correspondingly negative in accordance with the value of a first variable quantity and the terminal 196 is made positive and the terminal 194 correspondingly negative in accordance with the value of a second variable quantity the electron beam is shifted towards the back and right sides of the tube. This causes the beam strengths in each quadrant to vary, with the major portion being collected on the plate 144, as illustrated by the area within the broken lines in Figure 11.

The strengths of the different beam portions are added and/or subtracted from one another in a predetermined manner to obtain a resultant signal proportional to the product of the two input voltages from the sources 178 and 188 (Figure 12). If the beam has a substantially square shape in horizontal cross-section and a substantially constant strength U per unit area as it impinges on the collector plates, the strength of the beam portion impinging on the collector plate 144 (Figure 11) is expressed as follows:

$$S_1 = U(d^2 + dx + dy + xy) \quad (1)$$

where $S_1$ = the strength of the beam collected on the plate 144;
$d$ = one half of the width of the square beam as it impinges on the collector plates;
$x$ = the distance through which the beam is deflected to the left or right before it reaches the collector plates; and
$y$ = the distance through which the beam is deflected towards the front or rear of the tube before it reaches the deflector plates.

Similarly, $$S_2 = U(d^2 - dx + dy - xy) \quad (2)$$

where $S_2$ = the strength of the beam portion impinging on the collector plate 146;

$$S_3 = U(d^2 - dx - dy + xy) \quad (3)$$

where $S_3$ = the strength of the beam portion collected on the plate 148; and $$S_4 = U(d^2 + dx - dy - xy) \quad (4)$$

where $S_4$ = the strength of the beam portion collected on the plate 150.

Adding Equations 1 and 3, $$S_1 + S_3 = U(d^2 + 2xy) \quad (5)$$

Adding Equations 2 and 4, $$S_2 + S_4 = U(d^2 - 2xy) \quad (6)$$

If the Equation 6 is subtracted from Equation 5, the following relationship is obtained:

$$(S_1 + S_3) - (S_2 + S_4) = 4Uxy \quad (7)$$

Since the distances $x$ and $y$ through which the beam is deflected are proportional to the input voltages from the sources 188 and 178, respectively, the relationship expressed in Equation 7 is proportional to the product of the voltages. This relationship is obtained by the circuit shown in Figure 12.

As previously disclosed, each of the beam portions expressed in Equation 7 impinges on a different collector plate. The beam portion is then introduced to the grid of a tube associated with the collector plate to produce a current through the tube directly related to the strength of the beam portion. For example, if a positive voltage is applied to the terminal 196 and a correspondingly negative voltage to the terminal 194, the increased strength of the beam portions impinging on the collector plates 144 and 150 produces on the grids of the tubes 202 and 204, respectively, a bias which is negative with respect to the normal grid bias on the tubes.

In the above example, the negative bias on the grid of the tube 202 produces a decrease in the current which flows through the circuit including the power supplies 160 and 166, the potentiometer 216, the potentiometer 206, the tube 202, the cathode resistance 205 and the resistance 215. The voltage on the plate of the tube 202 therefore increases and causes the voltage on the right side of the potentiometer 206 to increase. The voltage on the right side of the potentiometer 208 similarly increases because of the decrease in voltage on the grid of the tube 204, and the voltages on the left side of the potentiometers 206 and 208 decrease because of the increase in voltage on the grids of the tubes 212 and 210, respectively. As disclosed above, the increase in grid bias voltage on the tubes 210 and 212 is caused by a decrease in the strength of the beam portions impinging on the collector plates 146 and 148.

The increase in voltage on the right side of the potentiometers 206 and 208 makes the grids of the tubes 218 and 220 more positive than normal and causes the currents through the tubes to increase. Since the tubes 218 and 220 are in cathode follower stages having equal resistances, the voltages at the cathodes of the tubes increase in proportion to the increase in current through the tubes. These voltages appear at the terminals 248 and 254.

In like manner, the decrease in the voltages on the left sides of the potentiometers 206 and 208 produces a decrease in voltage at the terminals 248 and 254. This decrease in voltage at the terminals 248 and 254 cancels the increase in voltage produced by the tubes 218 and 220, and the resultant voltage on each terminal remains unchanged and equal to the voltage on the other terminal. With one of the input voltages assumed to be zero as in the above example, the voltages at the terminals 248 and 254 should remain equal, since the difference between the voltages at the two terminals is substantially proportional to the product of the two input voltages from the sources 178 and 188.

If two voltages both different from zero are introduced to the wire deflection system from the sources 178 and 188, voltage changes are produced on the potentiometers 206 and 208 by each input voltage. The resultant voltages on the different sides of each potentiometer act through the tubes 218, 220, 222 and 224 to produce across the terminals 248 and 254 a voltage difference substantially proportional to the products of the two input voltages. This voltage difference appears across the cathodes of the tubes 174 and 176, which have relatively low impedances because of their location in cathode follower stages. By measuring the voltage difference at terminals having low and balanced impedances, the accuracy of the measurement is increased.

As previously disclosed, when a positive input voltage is introduced to the terminal 196 and a correspondingly negative voltage to the terminal 194, the strength of the beam portions impinging on the collector plates 144 and 150 increases, causing the currents through the resistances 244 and 250 to increase. The increase in strength of the beam portions impinging on the collector plates 144 and 150 also causes the currents through the resistances 228 and 230 to increase, and these increased currents in turn cause the voltage at the common terminal between the resistances to increase. This increase in voltage is fed back to the terminal 194 and is in opposition to the negative voltage originally introduced to the terminal. Similarly, a negative voltage is fed back to the terminal 196 in opposition to the positive voltage impressed on the terminal through the resistance 192. Thus, the negative feedback provided by the tubes 218, 220, 222 and 224 and their associated cathode resistances reduces the magnitude of the product output signals at the terminals 248 and 254 when a voltage difference is produced across the terminals for a product output different than zero. However, the negative feedback provides an increased stability and linearity in the operation of the circuits and insures that a voltage substantially proportional to the product of the two input numbers is always obtained between the terminals 248 and 254.

Sometimes the electron beam is not centered to produce equal beam portions in each of the four quadrants for zero input voltages from the sources 178 and 188, even though equal voltages are produced on the cathodes of the tubes 174 and 176 to indicate that the product of the two input voltages is zero. In such a case, the movable arms of the potentiometers 206 and 208 may be properly adjusted to center the beam without unbalancing the voltage on the cathodes of the tubes 174 and 176. For example, if the beam portions impinging on the collector plates 144 and 150 are greater than the beam portions impinging on the plates 146 and 148, the movable contacts of the potentiometers 206 and 208 are moved to the right in Figure 12. This causes the voltages on the right sides of the potentiometers 206 and 208 to decrease. Since the voltages on the plates of the tubes 202 and 204 similarly decrease because of their respective connections to the right sides of the potentiometers 206 and 208, an increase in current through the tubes is produced. The increase in tube currents is in turn caused by a change in bias on the grids of the tubes resulting from a decrease in the strength of the beam portions impinging on the plates 144 and 150. In like manner, the voltage at the left sides of the potentiometers 206 and 208 increase and produce an increase in the strengths of the beam portions impinging on the collector plates 146 and 148.

When a voltage difference exists between the terminals 248 and 254 to indicate a product output which should be zero, the movable arm of the potentiometer 216 may be adjusted in position until the voltages at the terminals 248 and 254 are equal. For example, if the voltage at the terminal 248 exceeds the voltage at the terminal 254, the movable arm of the potentiometer 216 is moved towards the potentiometer 208. This causes the voltages at the left and right sides of the potentiometer 206 to decrease, and the resultant decreases in the voltages on the cathodes of the tubes 218 and 224 cause the voltage at the terminal 248 to decrease. Similarly, the voltages at the left and right sides of the potentiometer 208 increase and produce an increase in voltage at the terminal 254.

Stability in the operation of the circuit shown in Figure 12 is also provided by the resistance 215. As previously disclosed, the currents produced in the tubes 202, 204, 210 and 212 by the different beam portions all flow through the resistance 215. Thus, the total current through the resistance 215 should always be substantially constant since the sum of the beam strengths should always be substantially constant regardless of the voltages from the sources 178 and 188.

If non-linearities in the multiplier tube cause the total beam current to decrease, the current through the resistance 215 similarly decreases and produces a reduction in the cathode voltage on each of the tubes 202, 204, 210 and 212 with respect to the voltage on the tube grid. This change in grid-to-cathode voltage in the tubes causes the currents through the tubes to increase and the total current through the resistance 215 to return to its normal value. Similarly, when tube non-linearities cause the beam current to increase, the resultant initial increase in current through the resistance 215 produces an increase in the cathode voltage relative to the grid voltage in each tube. This change in voltage relationships in each of the tubes 202, 204, 210 and 212 causes the current through the resistance 215 to return to substantially its normal value. In this way, the effects of any non-linearities are considerably reduced.

As illustrated in Figure 13, the tube and electrical circuit disclosed above may be used to obtain the quotient as well as the product of two numbers. In Figure 13, the numerator is designated Z, the denominator as $p$ and the desired quotient as $q$. The denominator $p$ is introduced to the multiplier tube and electrical circuit disclosed above, indicated generally at 260, and the Z input is introduced to a subtracting circuit 262. The subtracting circuit 262 may be built in accordance with the principles outlined on pages 629 to 648, inclusive, of volume 19 entitled "Wave Forms" of the "Radiation Laboratory Series" published by the Massachusetts Institute of Technology. The output from the multiplier tube and circuit 260 is also introduced to the input side of the subtracting circuit 262, and the output from the subtracting circuit 262 is introduced to a push-pull amplifier 264. The output from the amplifier 264 is introduced to an input terminal of the multiplier tube and circuit 260 and to a lead 266 connected to a measuring instrument (not shown) calibrated to indicate the value of the variable quantity in terms of voltage.

By introducing a variable $q$ input to the multiplier tube and circuit 260, a product of $Z_1$ is obtained. This product is compared in the subtracting circuit 262 with the actual numerator $Z$ and a difference value of $Z-Z_1$ is obtained. The value of $q$ is adjusted on the basis of the amplified value of $Z-Z_1$. Thus, if $Z-Z_1$ is positive, the value of $q$ provided by the output from the amplifier 264 is too low and is adjusted upwardly by the amplifier 264. In like manner, the value of $q$ is lowered by the amplifier 264 if $Z-Z_1$ is negative. The correct value of $q$ is obtained when $Z-Z_1$ becomes zero. The magnitude of $q$ is indicated by the relative values of the current in the two sides of the amplifier when $Z-Z_1=0$, and the polarity of $q$ is determined by the side of the amplifier having the greater current.

The tube and circuit disclosed above have several important advantages. They accurately convert the geometric relationship between a pair of variable quantities, involving either multiplication or division, into an arithmetic relationship involving addition and subtraction. Since addition and subtraction are considerably easier to perform than multiplication or division, the tube and circuit disclosed above facilitate the computation and insure that an answer with a minimum error is obtained. Furthermore, since the tube and circuit do not require any moving parts, they can operate rapidly and reliably for long periods of time without calibration, adjustment or repair and at frequencies ranging from direct voltage inputs to inputs in the video range. The tube and circuit provide an indication of the polarity as well as the magnitude of the geometric relationship between a pair of variable quantities.

Although this invention has been disclosed and illustrated with reference to particular applications, the principles involved are susceptible of numerous other applications which will be apparent to persons skilled in the art. The invention, therefore, is to be limited only as indicated by the scope of the appended claims.

What is claimed is:

1. Apparatus for determining the product of a pair of variable quantities expressed in a pair of input voltages proportional to the quantities, including, means for producing a beam, means for splitting the beam into a plurality of distinctive portions, means for producing relative displacements between the beam and the splitter means in a first direction through a distance in proportion to one of the input voltages and in a second direction transverse to the first direction through a distance in proportion to the other input voltage, means for separately collecting each portion of the split beam, means for producing signals having amplitudes proportional to the strengths of the different collected portions of the beam, and means for combining in an arithmetic relationship the signals representing the different beam portions to produce an output signal proportional to the product of the variable quantities.

2. Apparatus for determining the product of a pair of variable quantities expressed in input voltages proportional to the quantities, including, a plurality of collector plates arranged in quadrant relationship to one another, means for producing a beam, means for axially directing the beam toward the collector plates, means for deflecting the beam through angles directly related to the input voltages, means for producing signals having amplitudes dependent upon the strengths of the beam portions collected at the different plates, and an electrical circuit including an impedance network formed from a plurality of resistances for arithmetically combining the signals representing the portions of the beam impinging on the different collector plates to produce an output signal proportional to the product of the variable quantities.

3. Apparatus for determining the product of a pair of variable quantities expressed in a pair of input voltages proportional to the quantities, including, means for producing a beam, means for deflecting the beam in a first direction through an angle dependent upon the value of one of the input voltages and for deflecting the beam in a second direction transverse to the first direction through an angle dependent upon the value of the other input voltage, means for splitting the beam into a plurality of distinctive portions having strengths dependent upon the angular deflections of the beam in the first and second directions, means for producing a plurality of signals having amplitudes dependent upon the strengths of the beam portions, and an electrical circuit including an impedance network formed from a plurality of resistances for combining the signals representing the different portions of the beam in a particular arithmetic relationship to produce an output signal proportional to the product of the variable quantities.

4. The apparatus set forth in claim 3 in which particular signals are combined on an additive basis to form resultant signals and in which the resultant signals are combined on a subtractive basis to produce the output signal.

5. The apparatus set forth in claim 3 in which particular signals are combined on an additive basis to form resultant signals and in which the resultant signals are combined on a subtractive basis to produce the output signal and in which the resistances in the impedance network are variable to center the beam for zero input voltages and to produce a zero output signal when at least one of the input voltages is zero.

6. Apparatus for determining the product of a pair of variable quantities expressed in a pair of input voltages proportional to the quantities, including, means for producing a beam, means for channelizing the beam into separate compartments, means for providing a relative displacement between the beam and the channelizing means in a first direction through an angle dependent upon the value of one of the input voltages and in a second direction transverse to the first direction through an angle dependent upon the value of the other input voltage to control the beam portions channelized into the separate compartments, means for producing a plurality of signals having amplitudes proportional to the strengths of the beam portions channelized into the separate compartments, and an electrical circuit including an impedance network formed from a plurality of resistances for combining in an arithmetical relationship the signals representing the portions of the beam channelized into the different compartments to produce an output signal proportional to the product of the variable quantities.

7. Apparatus for determining the product of a pair of variable quantities expressed in a pair of input voltages proportional to the quantities, including, a cathode formed to produce a beam, a deflector system for bending the beam in a first direction through a particular angle in accordance with the value of one of the input voltages and in a second direction transverse to the first direction through a particular angle in accordance with the value of the other input voltage, a splitter plate for splitting the deflected beam into a plurality of portions having strengths dependent upon the deflection of the beam, a plurality of collector plates disposed to receive the different portions of split beam, means for producing a plurality of signals having amplitudes proportional to the strengths of the portions of the beam received at the different collector plates, and a circuit including an impedance network formed from a plurality of resistances for operating in an arithmetical relationship upon the signals representing the different portions of the beam to produce an output signal proportional to the product of the variable quantities, the resistances in the impedance network being adjustable to center the beam for zero input voltages and to produce a zero output voltage when at least one of the input voltages is zero.

8. The apparatus set forth in claim 7 in which pairs of signals representing particular beam portions are combined in an additive relationship to produce resultant signals and in which the resultant signals are combined in a subtractive relationship to produce the output signal.

9. Apparatus for determining the product of a pair of variable quantities expressed in input voltages proportional to quantities, including, a cathode for producing a beam, an anode for accelerating and focusing the beam, a deflector system for bending the beam in accordance with the values of the input voltages, a splitter plate for splitting the deflected beam, a lens system for spreading the beam, a plurality of collector plates operative to receive different portions of the split beam, means for producing a plurality of signals having amplitudes proportional to the strengths of the beam portions received at the different collector plates, and a circuit including a plurality of interconnected potentiometers for obtaining the difference between the signals representing particular portions of the beam and the signals representing the remaining portions of the beam to produce an output signal proportional to the product of the variable quantities, each of the potentiometers having a movable contact for adjusting the voltages provided by the potentiometer to center the beam for zero input voltages and to obtain a zero output voltage for a zero product.

10. Apparatus for determining the product of a pair of variable quantities expressed in direct input voltages proportional to the quantities, including, means for producing a beam, means separated from the beam-producing means for splitting the beam into a plurality of distinctive portions, means between the beam-producing and splitting means for deflecting the beam in two substantially perpendicular directions through angles proportional to the direct input voltages, means for separately collecting each portion of the split beam, means for producing a plurality of signals having amplitudes representative of the strengths of the different portions of the beam and a circuit including an impedance network formed from a plurality of resistances for combining the signals representing the different portions of the beam in a predetermined arithmetic relationship to produce a direct output voltage proportional to the product of the quantities.

11. Apparatus for determining the product of a pair of variable quantities expressed in input voltages proportional to the quantities, including, means for producing a beam, means for deflecting the beam through angles proportional to the input voltages, means for splitting the beam into quadrants having strengths dependent upon the deflection of the beam, means for producing a plurality of signals having amplitudes representative of the strengths of the different quadrants of the beam and a circuit including an impedance network formed from a plurality of resistances having adjustable values for adding and subtracting the signals representing the different beam portions in a predetermined manner to obtain an output signal proportional to the product of the quantities.

12. Apparatus for determining the product of a pair of variable quantities expressed in input voltages proportional to the quantities, including, means for producing a beam, means for deflecting the beam through two perpendicular angles each proportional to a different one of the direct input voltages, means for splitting the beam into quadrants having strengths dependent upon the deflection of the beam, an electrical circuit for obtaining the difference between the combined strengths of opposite pairs of beam portions to produce an output signal proportional to the product of the variable quantities, and means for adjusting the position of the beam to center the beam for zero input voltages and to obtain a zero output signal upon a zero value for at least one of the input voltages.

13. Apparatus for determining the product of a pair of variable quantities expressed in input voltages proportional to the quantities, including, a cathode for producing a beam, an anode for accelerating and focusing the beam, a deflector system for bending the beam in accordance with the values of the input voltages, a splitter plate for splitting the deflected beam into quadrants, the splitter plate being positioned to split the beam into equal quadrants for a condition of no beam deflection, a lens system for spreading the beam to facilitate the splitting of the beam into the different quadrants, a plurality of collector plates operative to receive different portions of the split beam, a circuit for obtaining the difference between the combined strengths of predetermined beam portions and the combined strengths of the remaining beam portions to produce an output signal proportional to the product of the quantities, and means including a plurality of adjustable impedances in the circuit for altering the position of the beam to center the beam for zero input voltages and to obtain a zero output voltage for at least one zero input voltage.

14. In apparatus for determining the product of a pair of variable quantities expressed in input voltages proportional to the quantities, a plurality of deflector wires arranged relative to one another to deflect a beam in first and second transverse directions through angles dependent upon the values of the input voltages, means for varying in progressive steps the voltages on different wires in the plurality in accordance with the input voltages to provide a proper deflection of the beam for such input voltages, means for collecting different portions of the beam in accordance with the beam deflection, and an electrical circuit including an impedance network formed from a plurality of adjustable resistances for operating upon the different collected portions of the beam to produce an output signal directly related to the value of the product of the variable quantities, the resistances being adjustable relative to one another to center the beam for zero input voltages and to produce a zero output signal upon the occurrence of at least one zero input voltage.

15. In apparatus for determining the product of a pair of variable quantities expressed in input voltages proportional to the quantities, a plurality of deflector wires arranged relative to one another in a rectangular configuration to deflect a beam in first and second directions perpendicular to one another through angles proportional to the values of the input voltages, an impedance network having particular impedances connected to different deflector wires to impose a voltage difference proportional to a different one of the input voltages between each pair of parallel sides in the rectangle and voltages of progressive value on successive wires along the parallel sides, means for collecting different portions of the beam in accordance with the beam deflection, means for operating upon the different collected portions of the beam in a particular relationship to produce an output signal directly related to the value of the product of the variable quantities, and means including an impedance network formed from a plurality of adjustable resistances for centering the beam for zero input voltages and for adjusting the deflection of the beam to obtain a zero output voltage upon the occurrence of at least one zero input voltage.

16. In combination with means for deflecting a beam in accordance with the values of a pair of input voltages representing variable quantities whose product is to be determined and for splitting the beam into quadrants having strengths dependent upon the deflection of the beam, an impedance network having a plurality of terminals, means for varying the voltage on each terminal in the impedance network in accordance with the strength of a different beam quadrant, electrical circuits including an impedance network formed from a plurality of resistances for combining the voltages on pairs of terminals in the impedance network corresponding to opposite quadrants to produce a pair of output voltages, and electrical circuits including the impedance network for obtaining the voltage difference between the pair of output voltages to produce a signal substantially proportional to the product between the input voltages representing the variable quantities.

17. In combination with means for deflecting a beam in accordance with the values of a pair of input voltages representing variable quantities whose product is to be determined and for splitting the beam into quadrants having strengths dependent upon the deflection of the beam, an impedance network formed from a plurality of resistances adjustable in value and having a plurality of output terminals, means for adjusting the resistances to center the beam with respect to the quadrants for input voltages representing variable quantities having a value of zero, means for varying the voltage on each output terminal in the impedance network in accordance with the strength of a different beam quadrant, means including the impedance network for combining the voltages on pairs of terminals corresponding to diagonally opposite quadrants to produce a pair of output voltages, and means for obtaining the voltage difference between the pair of output voltages to produce a signal substantially proportional to the product between the input voltages representing variable quantities.

18. In combination with means for deflecting a beam in accordance with the values of a pair of input voltages reprsenting variable quantities whose product is to be determined and for splitting the beam into quadrants having strengths dependent upon the deflection of the beam, an impedance network formed from a plurality of variable resistances and having a plurality of output terminals, variable means in the impedance network for adjusting in a predetermined manner the impedances presented to each of the beam quadrants to center the beam with respect to the quadrants for input voltages representing variable quantities having a value of zero, means for varying the voltage on each terminal in the impedance network in accordance with the strength of a different beam quadrant, means including the impedance network for combining the voltages on pairs of terminals corresponding to diagonally opposite quadrants to produce a pair of output voltages, means including the impedance network for obtaining the voltage difference between the pair of output voltages to produce a signal substantially proportional to the product between the input voltages representing the variable quantities, and variable means in the impedance network for adjusting in a predetermined manner the impedances presented to each of the beam quadrants to produce a substantially zero output signal when the product between the two input voltages representing the variable quantities is substantially zero.

19. In combination, a plurality of deflector wires arranged relative to one another to deflect a beam in first and second directions through angles dependent upon the values of a pair of input voltages representing variable quantities whose product is to be determined, an impedance network having a plurality of impedances connected to the different deflector wires in a predetermined manner to vary the voltages on successive wires in progressive steps so as to provide a proper deflection of the beam, means operative to split the beam into quadrants having strengths dependent upon the beam deflection, means for producing a plurality of signals having amplitudes determined by the strengths of the beam in the different quadrants, electrical circuits for combining the signals representing pairs of adjacent beam quadrants to produce feedback signals, electrical circuits for introducing the feedback signals to predetermined terminals in the impedance network in an opposite polarity to the signals originally introduced to the network to provide the beam deflection, and electrical circuits for combining the signals representing pairs of oppositely disposed beam quadrants to produce a resultant pair of signals having a difference in strength proportional to the product between the input voltages representing the variable quantities.

References Cited in the file of this patent

UNITED STATES PATENTS

| | | |
|---|---|---|
| 2,027,393 | McCreary | Jan. 14, 1936 |
| 2,122,102 | Lundell | June 28, 1938 |
| 2,205,071 | Skellett | June 18, 1940 |
| 2,228,266 | Gray | Jan. 14, 1941 |
| 2,257,795 | Gray | Oct. 7, 1941 |
| 2,312,761 | Hershberger | Mar. 2, 1943 |
| 2,324,851 | Koch | July 20, 1943 |
| 2,361,766 | Hadekel | Oct. 31, 1944 |
| 2,372,450 | Rajchman | Mar. 27, 1945 |
| 2,431,396 | Hansell | Nov. 25, 1947 |
| 2,433,236 | Rajchman et al. | Dec. 23, 1947 |
| 2,436,393 | Maggio | Feb. 24, 1948 |
| 2,437,275 | Skene et al. | Mar. 9, 1948 |
| 2,457,911 | Munster | Jan. 4, 1949 |
| 2,459,724 | Selgin | Jan. 18, 1949 |
| 2,530,775 | Kliever | Nov. 21, 1950 |
| 2,534,372 | Ring | Dec. 19, 1950 |
| 2,547,631 | Evans | Apr. 3, 1951 |
| 2,552,619 | Carbrey | May 15, 1951 |
| 2,553,735 | Adler | May 22, 1951 |
| 2,568,449 | Hansen | Sept. 18, 1951 |
| 2,572,861 | Hutter | Oct. 30, 1951 |
| 2,605,341 | Vacquier et al. | July 29, 1952 |
| 2,613,273 | Kalfaian | Oct. 7, 1952 |

FOREIGN PATENTS

| | | |
|---|---|---|
| 114,885 | Great Britain | May 13, 1942 |